(12) United States Patent
Dariavach et al.

(10) Patent No.: US 7,393,193 B1
(45) Date of Patent: Jul. 1, 2008

(54) TECHNIQUES FOR MAKING A METALLIC PRODUCT UTILIZING ELECTRIC CURRENT IN A CONSOLIDATION PROCESS

(75) Inventors: Nader G. Dariavach, Upton, MA (US); James A. Rice, Waukesha, WI (US)

(73) Assignee: EMC Corporation, Hopkinton, MA (US)

( * ) Notice: Subject to any disclaimer, the term of this patent is extended or adjusted under 35 U.S.C. 154(b) by 346 days.

(21) Appl. No.: 11/022,512

(22) Filed: Dec. 22, 2004

(51) Int. Cl.
B29C 43/14 (2006.01)

(52) U.S. Cl. ............... 425/78; 425/167; 425/174.6; 425/407; 425/412; 425/415

(58) Field of Classification Search ............ 425/78, 425/163–167, 174.6, 352–355, 407–408, 425/412–415
See application file for complete search history.

(56) References Cited

U.S. PATENT DOCUMENTS

| | | | | |
|---|---|---|---|---|
| 531,197 | A | 12/1894 | Lemp | 219/50 |
| 2,473,245 | A | 6/1949 | Hanna | 219/152 |
| 2,890,324 | A | 6/1959 | Havlik | 219/149 |
| 3,988,913 | A | 11/1976 | Metcalfe et al. | 72/69 |
| 3,988,914 | A | 11/1976 | Metcalfe et al. | 72/69 |
| 4,307,280 | A | 12/1981 | Ecer | 219/76.1 |
| 4,532,793 | A | 8/1985 | Bezold | 72/342.96 |
| 5,042,281 | A | 8/1991 | Metcalfe | 72/200 |
| 5,071,333 | A * | 12/1991 | Burt et al. | 425/78 |
| 5,515,705 | A | 5/1996 | Weldon et al. | 72/19.1 |
| 6,383,446 | B1 * | 5/2002 | Tokita | 425/78 |
| 6,489,584 | B1 | 12/2002 | Kelly | 219/121.46 |
| 6,767,505 | B2 * | 7/2004 | Witherspoon et al. | 425/78 |
| 7,028,522 | B2 | 4/2006 | Kim et al. | 72/202 |

FOREIGN PATENT DOCUMENTS

RO 91642 A 5/1987

OTHER PUBLICATIONS

Nader G. Dariavach, "The Effect of High Density Electric Pulses on Sintered Aluminum 201AB SiC MMC PM Compacts During Plastic Deformation", Oct. 2002, pp. 1-176.
Nader G. Dariavach and James A. Rice, "Electromigration and the Electroplastic Effect in Aluminum SiC MMCs", May 2000, pp. 40-42.

* cited by examiner

*Primary Examiner*—Yogendra N. Gupta
*Assistant Examiner*—Thu Khanh T. Nguyen
(74) *Attorney, Agent, or Firm*—BainwoodHuang

(57) ABSTRACT

A system is capable of making a metallic product with robust mechanical and electrical properties. The system includes a pressing stage configured to compress powder (e.g., MMC material) to form a green compact from the powder, a sintering stage configured to sinter the green compact to form a sintered structure from the green compact, and a consolidation stage configured to apply electric current to the sintered structure to form the metallic product from the sintered structure. The electric current is in the form of high density, short electric AC or DC pulses and results in consolidation of the sintered structure at grain boundaries to correct defects in the boundaries (e.g., areas of high electrical resistance) without melting the bulk metal to produce the metallic product. Such a system alleviates the need for coining process, which could fracture bonds and thus weaken the structure, following the sintering process.

19 Claims, 5 Drawing Sheets

TECHNIQUES FOR MAKING A METALLIC PRODUCT UTILIZING ELECTRIC CURRENT IN A CONSOLIDATION PROCESS

BACKGROUND

Metal matrix composites (MMCS) refer to a class of composite materials in which one constituent is a metal or alloy, and another constituent is a reinforcement. Such material is capable of being fabricated into a variety of components having improved properties such as the strength characteristics of steel (e.g., increased stiffness, enhanced fatigue strength, improved wear resistance, etc.) at a fraction of the weight. Such properties also include excellent performance at high temperatures (e.g., durability with an extremely low co-efficient of thermal expansion), the absence of out gassing and high electrical conductivity, among others.

Accordingly, such material has found its way into a variety of practical applications. For example, manufacturers have used MMC material to fabricate electronic heat sinks, automotive components (e.g., drive shafts, push rods, brake rotors, etc), aircraft components (e.g., fins, nozzles, washers, etc.) and electronic components (e.g., composite conductors, electronic packaging elements, etc.).

One conventional powder metal (PM) fabrication process includes a compaction step, a sintering step and a coining step. In the compaction step, a manufacturer cold presses the MMC material into what is commonly referred to a green compact having the general shape of the end result component. In the sintering step, the manufacturer heats the green compact to a temperature that is just under the melting temperature of the metal constituent in order to metallurgically bond grains within the green compact together and thus consolidate the compact into a reduced structure. In the coining step, the manufacturer re-presses the structure to provide higher precision finishing for the component.

SUMMARY

Unfortunately, there are deficiencies to the above-described conventional MMC fabrication process which uses a coining step. For example, during the coining step, the manufacturer may inadvertently fracture existing bonds within the structure thus mechanically weakening the component. Additionally, the manufacturer is required to invest time, effort and expense in carrying out the coining step.

In contrast to the above-described conventional MMC fabrication process which uses a coining step, embodiments of the invention are directed to techniques for making a metallic product utilizing electric current (e.g., high density, short AC or DC electric pulses) to consolidate an MMC structure following a sintering operation. The electric current is capable of further consolidating the structure in a manner that alleviates the need for a coining step which could otherwise mechanically weaken the structure. In particular, the electric current is capable of generating non-uniform heating within the structure resulting in localized melting of high resistance portions of the structure with minimal affect on the overall structural shape. Moreover, due to further consolidation provided by the electric current, the sintering operation is capable of occurring at a lower temperature than that of a conventional sintering step thus minimizing deformation and maintaining accurate dimensions in the structure.

One embodiment of the invention is directed to a system for making a metallic product. The system includes (i) a pressing stage configured to compress powder (e.g., MMC material) to form a green compact from the powder, (ii) a sintering stage configured to sinter the green compact to form a sintered structure from the green compact, and (iii) a consolidation stage configured to apply electric current to the sintered structure to form the metallic product from the sintered structure. The electric current is preferably in the form of short electric pulses and results in consolidation of the sintered structure at grain boundaries to correct defects in the boundaries (e.g., areas of high electrical resistance) without melting the bulk metal thus producing an accurately dimensioned, robust and reliable metallic product.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to powder metal (PM) techniques for making a product utilizing electric current (e.g., high density, short AC or DC electric pulses) to consolidate an MMC structure following a sintering operation. The electric current is capable of further consolidating the structure in a manner that alleviates the need for a coining step which could otherwise mechanically weaken the structure (e.g., by fracturing existing bonds). In particular, the electric current is capable of generating focused heating of high resistance portions within the structure (e.g., to correct defective particle boundaries and to remove any remaining voids in grain boundaries) resulting in localized melting with minimal affect on the overall structural shape. Furthermore, due to further consolidation provided by the electric current, the sintering operation is capable of occurring at a lower temperature than that of a conventional sintering step thus minimizing deformation and maintaining accurate dimensions in the structure.

Figure 1:
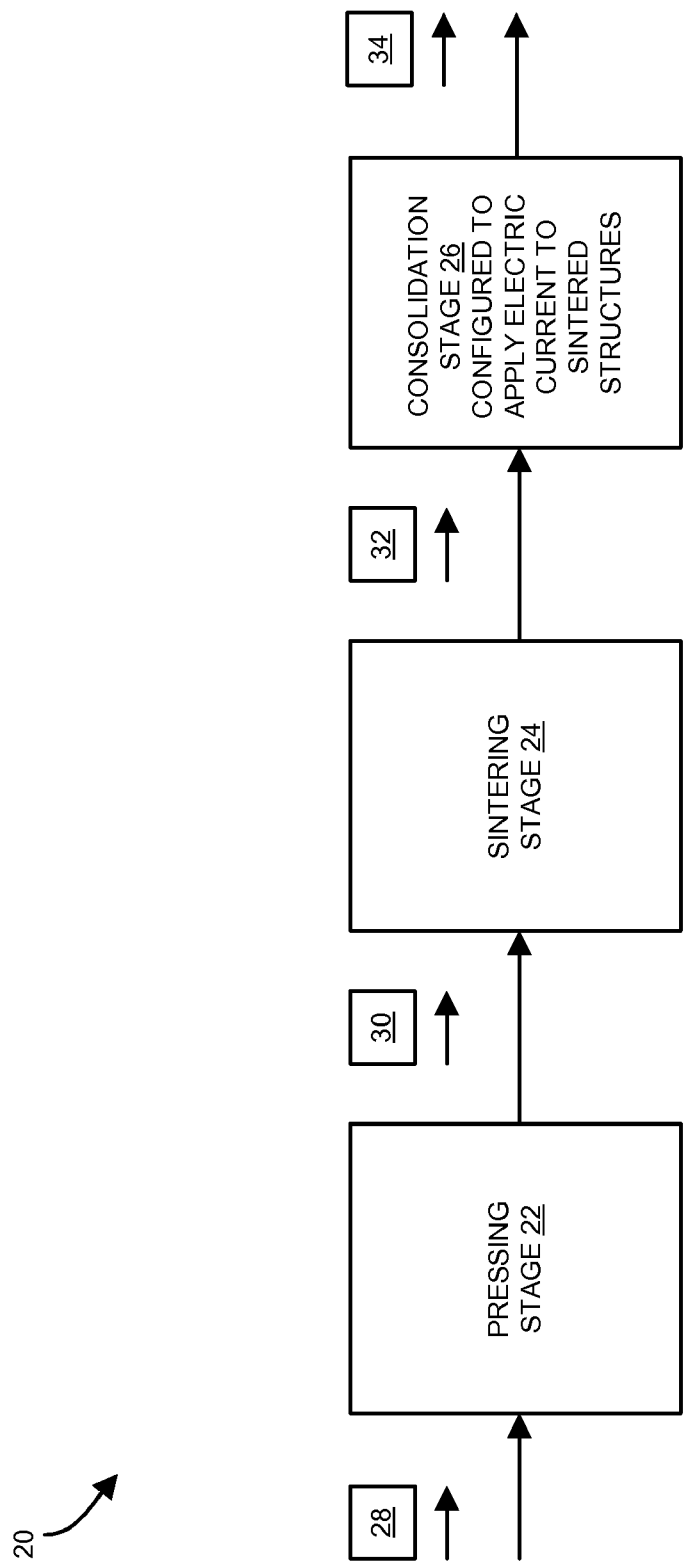
FIG. 1 is a block diagram of a system which is configured to make a metallic product utilizing electric current in a consolidation process.

FIG. 1 shows a manufacturing system 20 which is suitable for use by the invention. The manufacturing system 20 includes a pressing (or compacting) stage 22, a sintering stage 24, and a consolidation stage 26. The pressing stage 22, the sintering stage 24, and the consolidation stage 26 are arranged in a pipelined manner with input entering on the left side of each stage and output exiting on the right side of each stage.

As shown in FIG. 1, the pressing stage 22 is configured to compress metal powder 28 to form a green compact 30. Such compression removes voids between particles, and provides a precise shape to the material (e.g., a finned heat sink). Metal matrix composite (MMC) material is particularly well-suited for use as the metal power 28. Examples of suitable metal constituents include powdered aluminum, steel, titanium, magnesium, copper, similar metals and alloys, etc. Examples of suitable reinforcements include boron, silicon carbide, aluminum oxide, graphite, alumina, and similar fibrous constituents.

The sintering stage 24 receives the green compact 30 and sinters the green compact 30 to form a sintered structure 32. Preferably, the sintering stage 24 includes a controlled atmosphere furnace which is configured to weld particles within the green compact 30 together while causing minimal deformation if any (e.g., the controlled atmosphere furnace provides a vacuum or inert gas atmosphere to inhibit or reduce oxide formation and a temperature which is safely below the melting point of the metal constituent). As a result, within the sintered structure 32, particle boundaries have melted together to form strong and tight metallurgical bonds. Moreover, fibers of the reinforcement are now richly embedded to provide enhanced properties (e.g., increased strength).

The consolidation stage 26 then receives the sintered structure 32 and applies electric current through the structure 32 to further consolidate the material and thus form the metal product 34. The electric current (e.g., high density, short AC or DC electric pulses) causes non-uniform heating within the sintered structure 32 but does not cause complete melting of the bulk material. In particular, defective boundaries (e.g., dislocations) within the sintered structure 32 provide areas of high electrical resistance. When the electric current passes through the structure 32, these high resistance areas become "hot spots" where the temperature rises to or above the melting temperature of the main constituent. Accordingly, defective particle boundaries tend to re-melt and correct themselves resulting in a stronger, more tightly bonded consolidated metal product 34.

It should be understood that consolidation resulting from the applied electric current alleviates the need to further compress the material in a conventional coining process which could otherwise fracture bonds and reinforcement fibers to weaken the product and introduce hidden flaws in the product. That is, there is no coining process needed that could introduce micro-cracks, ceramic particle fractures and/or delamination of the MMC material. Moreover, bond repair and formation from the applied electric current is so effective, the sintering temperature provided by the sintering stage 24 is capable of being lowered vis-a-vis conventional sintering temperatures which are just below the melting temperature of the main constituent thus reducing the likelihood of losing precision from melting too much of the material. Further details of the invention will now be provided with reference to FIGS. 2 and 3.

Figure 2:
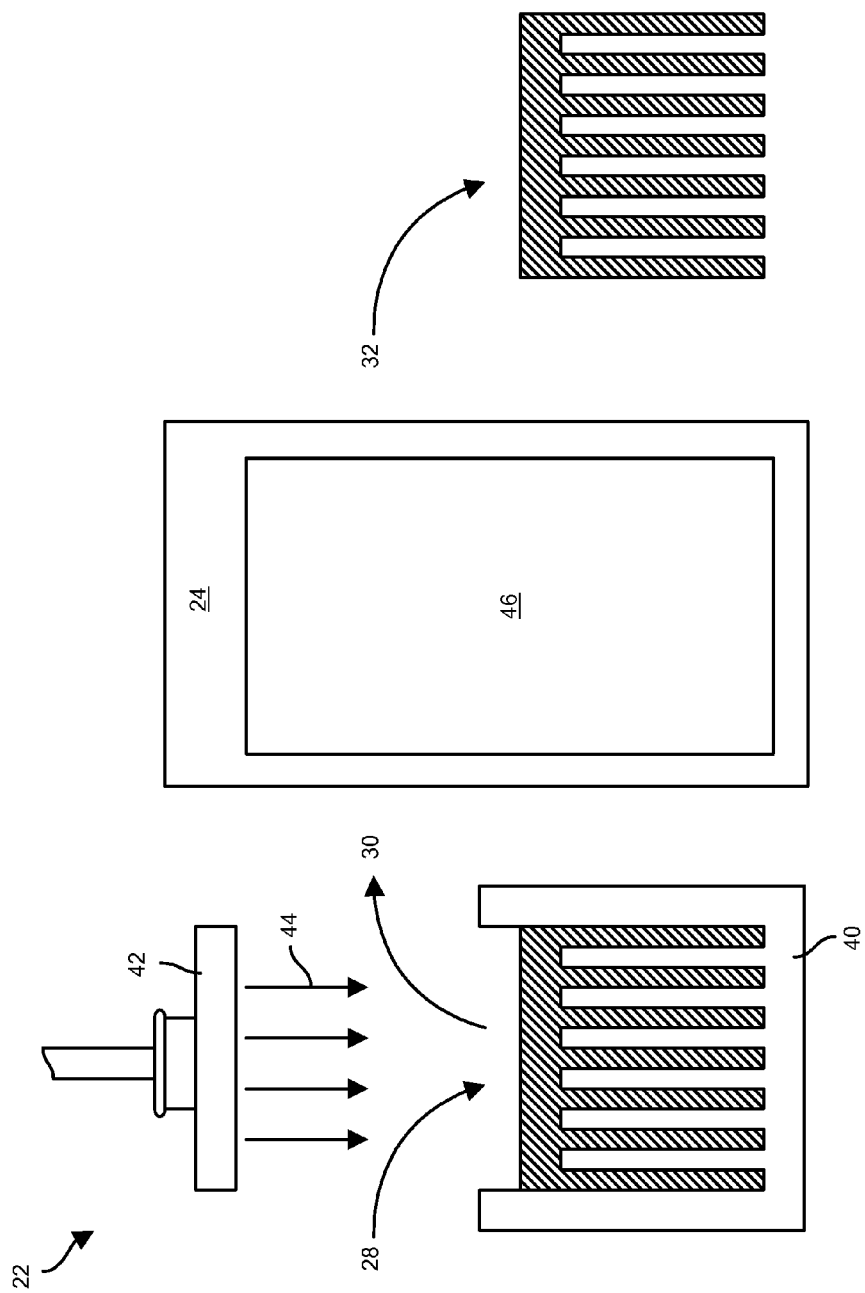
FIG. 2 is a block diagram of a pressing stage and a sintering stage of the system of FIG. 1.
Figure 3:
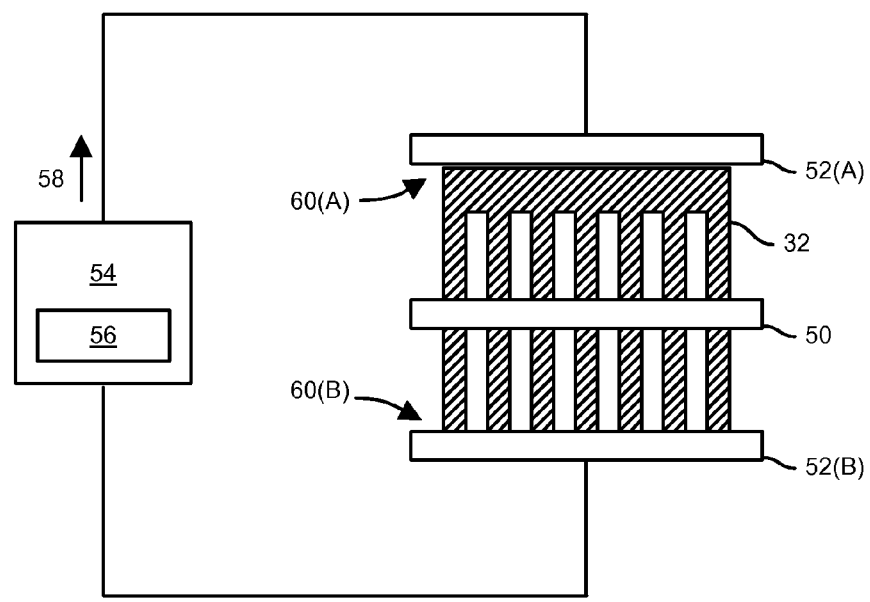
FIG. 3 is a block diagram of a consolidation stage of the system of FIG. 1.

FIGS. 2 and 3 show particular details of the system 20 in the context of a process which manufactures heat sinks by way of example only. In particular, FIG. 2 shows MMC material during the pressing stage 22 and the sintering stage 24, and FIG. 3 shows the MMC material during the consolidation stage 26. It should be understood that metal products other than heat sinks are capable of being made in the same manner by the system 20.

As shown in FIG. 2, the pressing stage 22 includes a lower die 40 and an upper die 42. After the lower die 40 fills with the powder 28, the upper die 42 moves in a direction 44 toward the lower die 40 to squeeze the powder 28 within the lower die 40. Here, fiber and matrix compress together to achieve a particular density. As a result, the pressing stage 22 removes voids within the material and provides a precise shape to the green compact 30.

The green compact 30 then passes through the sintering stage 24 which provides a heated environment to the green compact 30 for a specified period of time. In particular, heating equipment 46 (e.g., a controlled atmosphere furnace) of the sintering stage 24 provides a thermal treatment which is below the melting point of main metallic constituent. As a result, metallurgical bonding occurs between particles of the green compact 30 to produce a sintered structure 32 with a well-maintained shape. As will be explained in further detail shortly, the sintering temperature provided by the sintering stage 24 is capable of being substantially lower than that provided during conventional sintering since further consolidation is achieved by the consolidation stage 26.

As shown in FIG. 3, the consolidation stage 26 includes a holder 50, electrodes 52(A), 52(B) (collectively, electrodes 52) which are adjacent the holder 50, and a controller 54. The holder 50 is configured to hold the sintered structure 32. The electrodes 52 are configured to contact portions of the sintered structure 32. The controller 54 includes a power source 56 which is configured to provide electric current 58 through the sintered structure 32 using the electrodes 52 (e.g., a burst of electric current at periodic intervals) to form the metallic product 34. Preferably, the power source 56 is adjustable to enable a user to adjust particular characteristics (e.g., electric current amplitude, pulse width/duration, periodicity, etc.) depending on particular attributes of the sintered structure 32 such as the constituents within the sintered structure 32, the shape and size of the sintered structure 32, the particle size of the MMC mixture, etc. Accordingly, the user is capable of precisely tuning the consolidation stage 26 for optimal melting of grain boundaries an minimal or no melting of entire grains of the sintered structure 32.

In the context of the above-provided heat sink example, the electrode 52(A) is configured is plate-shaped and contacts a base side 60(A) of the sintered structure 32, and the electrode 52(B) is also plate-shaped and contacts a heat distribution side 60(B) of the sintered structure 32. Accordingly, the electric current 58 passes through the various portions of the sintered structure 32 in a distributed manner. That is, the electric current 58 tends to flow through from the base side 60(A) into each portion of the heat distribution side 60(B) relatively uniformly in order to provide grain boundary melting in each portion (e.g., each fin). The controller 50 provides the electric current 56 in pulses to promote only localized melting and rapid solidification near high resistance areas for minimal deformation.

It should be understood that the use of high density, short electric pulses does not substantially raise the overall temperature of the metallic product 34. Rather, the electric current 56 is capable of being easily applied at room temperature, and the temperature rise in the bulk structure is insignificant (i.e., the temperature of the metallic product remains near room temperature). Accordingly, application of the electric current 56 is simple and convenient making very well suited for manufacturing in high volume and at low cost. Further details of the invention will now be provided with reference to FIG. 4.

Figure 4:
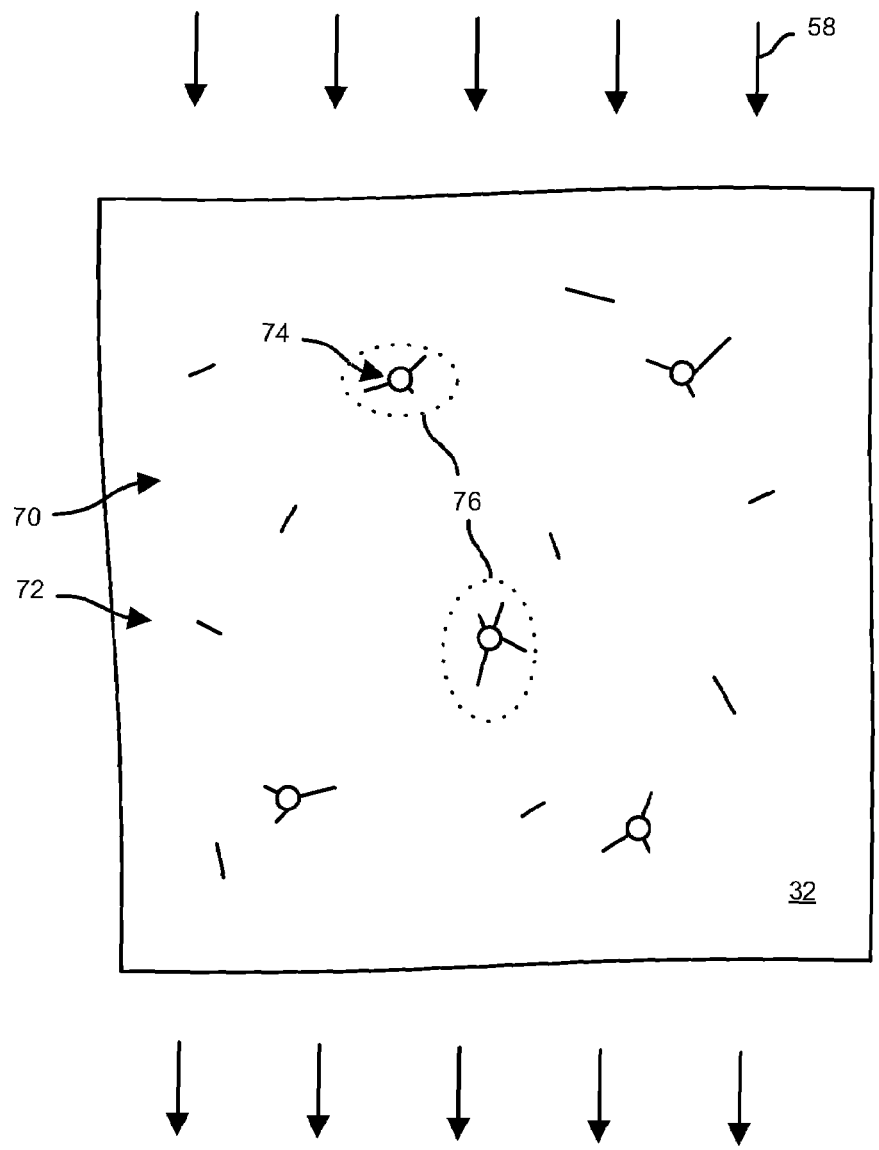
FIG. 4 is a detailed illustration of the effect of electric current, which is applied by the system of FIG. 1, on a structure operated on while in the consolidation stage.

FIG. 4 is a detailed illustration of the effect of the electric current 56 through a portion of the sintered structure 32. As shown, the sintered structure 32 includes both a main constituent 70 (e.g., metallic powder illustrated generally by the arrow 70) and a secondary constituent 72 (e.g., a reinforcement illustrated generally by the arrow 72). The pressing stage 22 has compacted the constituents 70, 72 together to remove voids, and the sintering stage 24 has formed metallurgical bonds within the sintered structure 32. However, some boundary defects 74 may remain, e.g., due to dislocations.

As shown in FIG. 4, the electric current 58 flowing through the sintered structure 32 generates localized heating effects in areas 76 immediately around the boundary defects 74. Such heating results from current flowing through areas of the naturally higher electrical resistance vis-a-vis other areas with correctly formed particle boundaries. Accordingly, the incorrectly formed boundaries 74 re-melt and repair themselves, i.e., through chemical reduction.

It should be understood that the electrical characteristics of the electric current 58 are purposefully selected to avoid completely melting the entire particles and so that heating remains substantially localized around the boundary defects 76 to simply weld particles together. High density, short AC or DC electric pulses are particularly well-suited to accomplish this effect. Here, the effect of Joule heat release during propagation of pulses of sufficiently high current density results in robust localized melting and rapid solidification of material near lower conductive areas including grain boundaries.

In one arrangement, the MMC main constituent is powdered aluminum and the controller 50 of the consolidation stage 26 applies AC current for time intervals which are less than or equal to 10 milliseconds to provide current through the sintered structure 32 at a density which is greater than 80 Amperes of electric current per square millimeter (e.g., 100 Amperes of electric current per square millimeter of material). In such a situation, robust consolidation occurs to a penetration depth of 2.5 to 3.0 millimeters making the system 20 very-well suited for manufacturing metallic products 34 such as heat sinks and similarly shaped products (e.g., automotive components, aircraft components, electronic components, etc.). Further details of the invention will now be provided with reference to FIG. 5.

Figure 5:
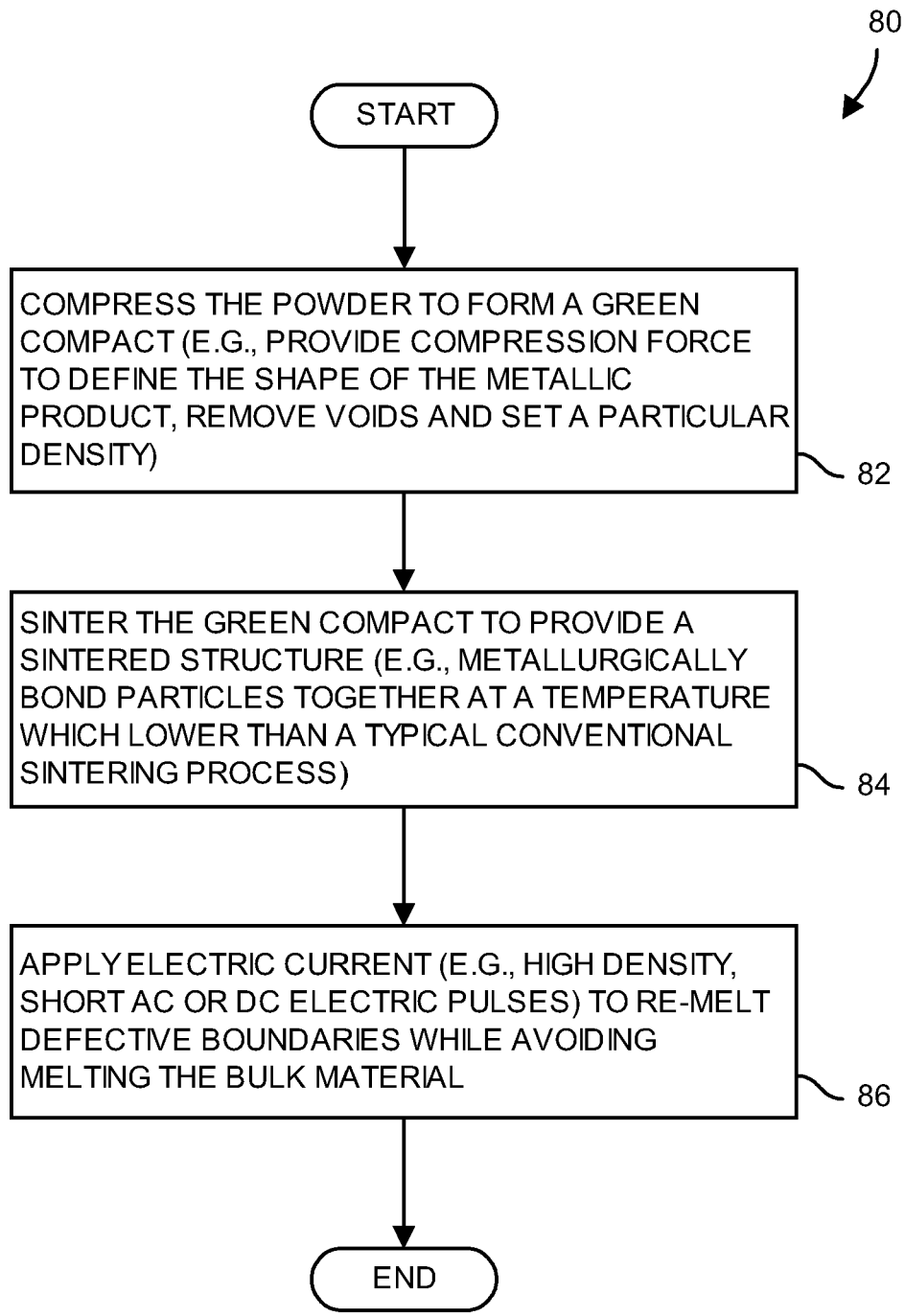
FIG. 5 is a flowchart of a procedure which is performed by a manufacturer of the metallic product.

FIG. 5 is a flowchart of a procedure 80 which is performed by a user of the system 20 (FIG. 1) when manufacturing the metallic product 34. In step 82, the user provides the powder 28 (e.g., MMC material) to the pressing stage 22 and compresses the powder 28 to form the green compact 30. Such pressing defines the ultimate shape of the metallic product 34 by removing voids between particles and achieving a particular particle density.

In step 84, the user passes the green compact 30 through the sintering stage 24. Heating equipment of the sintering stage 24 preferably provides a temperature which causes metallurgical bonding between particles without completely melting the particles. The sintering temperature is capable of being lower than conventional sintering temperatures since further consolidation is later achieved by the consolidation stage 26. As a result, the resulting sintered structure 32 substantially maintains its shape without need for finishing by a coining process that could otherwise cause fractures metallurgical bonds and ceramic fibers in the structure 32 and thus weaken the structure 32.

In step 86, the user uses the consolidation stage 26 to apply electric current 58 to the sintered structure 32 to form the metallic product 34 from the sintered structure 32. In particular, the user sets the power source 56 of the controller 50 (FIG. 2) so that it provides current having appropriate electrical characteristics (e.g., (e.g., high density, short AC or DC electric pulses) to generate localize heating which corrects defective particular boundaries 74 while avoiding completely melting particles. As a result, the metallic product 34 possesses reliable metallurgical bonds and retains its shape without any need for a coining procedure.

As mentioned above, embodiments of the invention are directed to techniques for making a metallic product 34 utilizing electric current 58 (e.g., high density, short AC or DC electric pulses) to consolidate an MMC structure 32 following a sintering operation. The electric current 58 is capable of further consolidating the structure in a manner that alleviates the need for a conventional coining step which could otherwise mechanically weaken the structure (e.g., by fracturing existing bonds). In particular, the electric current 58 is capable of generating focused heating of high resistance portions within the structure (e.g., defective particle boundaries) resulting in localized melting with minimal affect on the overall structural shape. Furthermore, due to further consolidation provided by the electric current 58, the sintering operation is capable of occurring at a lower temperature than that of a conventional sintering step thus minimizing deformation and maintaining accurate dimensions in the structure.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A system for making a metallic product, the system comprising:
    a pressing stage which is configured to compress powder to form a green compact from the powder;
    a sintering stage, coupled to the pressing stage, which is configured to sinter the green compact to form a sintered structure from the green compact; and
    a consolidation stage, coupled to the sintering stage, which is configured to apply electric current to the sintered structure to form the metallic product from the sintered structure, the electric current being configured to consolidate the sintered structure at grain boundaries to produce the metallic product; wherein the consolidation stage includes:
    a holder configured to hold the sintered structure;
    a first electrode adjacent the holder, the first electrode being configured to contact a first side of the sintered structure when the sintered structure is held within the holder;
    a second electrode adjacent the holder, the second electrode being configured to contact a second side of the sintered structure when the sintered structure is held within the holder; and
    a controller coupled to the first and second electrodes, the controller being configured to apply, as the electric current, electric bursts through the sintered structure using the first and second electrodes;
    wherein the controller, when applying the electric bursts, is configured to:
    provide, as the electric bursts, a high density short pulse of current between the first and second electrodes through the sintered structure at periodic intervals to generate non-uniform heating within the sintered structure which results in localized melting of high resistance portions of the sintered structure;
    wherein the controller includes:
    a power source configured to provide, as a high density short pulse, current for a time interval which is less than or equal to 10 milliseconds; and
    wherein the power supply, when providing the current for the time interval, is configured to:
    provide, through the sintered structure, greater than 80 Amperes of electric current per square millimeter.

2. The system of claim 1 wherein the pressing stage includes:
    a lower die which is configured to receive, as the powder, metal matrix composite material; and an upper die which is configured to move toward the lower die to squeeze the metal matrix composite material into the green compact.

3. The system of claim 2 wherein the sintering stage includes:
   heating equipment configured to heat the green compact to a sintering temperature which is substantially less than a melting temperature of the metal matrix composite material.

4. The system of claim 3 wherein the controller includes:
   an adjustable power source which is configured to set electrical characteristics of the high density short pulse, based on specific material within the metal matrix composite material, to melt grain boundaries of the sintered structure without melting entire grains of the sintered structure.

5. The system of claim 1 wherein the consolidation stage, when applying the electric current to the sintered structure, is configured to:
   dispose the sintered structure within an environment having a temperature which is lower than that of the sintering stage, and
   apply the electric current to the sintered structure while the sintered structure is disposed within the environment having the temperature which is lower than that of the sintering stage to consolidate the sintered structure while the sintered structure is at a temperature which is lower than that of the sintering stage.

6. The system of claim 5 wherein the consolidation stage, when disposing the sintered structure within the environment having the temperature which is lower than that of the sintering stage, is configured to:
   after the sintered structure exits the sintering stage and enters the environment, bring the sintered structure substantially to room temperature to enable application of the electric current to the sintered structure while the sintered structure is substantially at room temperature, the application of electric current causing substantially no rise in the temperature of the bulk sintered structure.

7. The system of claim 1 wherein the power supply, when providing the current for the time interval, is configured to provide, through the sintered structure, substantially 100 Amperes of electric current per square millimeter in the form of electric pulses.

8. A system for making a metallic product, the system comprising:
   a pressing stage which is configured to compress powder to form a green compact from the powder;
   a sintering stage, coupled to the pressing stage, which is configured to sinter the green compact to form a sintered structure from the green compact; and
   means, coupled to the sintering stage, for applying electric current to the sintered structure to form the metallic product from the sintered structure, the electric current being configured to consolidate the sintered structure at grain boundaries to produce the metallic product;
   wherein the means for applying the electric current includes:
      a holder configured to hold the sintered structure;
      a first electrode adjacent the holder, the first electrode being configured to contact a first side of the sintered structure when the sintered structure is held within the holder;
      a second electrode adjacent the holder, the second electrode being configured to contact a second side of the sintered structure when the sintered structure is held within the holder; and
      means for applying, as the electric current, electric bursts through the sintered structure using the first and second electrodes;
   wherein the means for applying the electric bursts includes:
      means for providing, as the electric bursts, a high density short pulse of current between the first and second electrodes through the sintered structure at periodic intervals to generate non-uniform heating within the sintered structure which results in localized melting of high resistance portions of the sintered structure;
   wherein the means for providing the high density short pulse includes:
      means for providing, as a high density short pulse, current for a time interval which is less than or equal to 10 milliseconds; and
   wherein the means for providing the current for the time interval includes:
      means for providing, through the sintered structure, greater than 80 Amperes of electric current per square millimeter.

9. The system of claim 8 wherein the means for applying electric current to the sintered structure, when applying the electric current to the sintered structure, are configured to:
   dispose the sintered structure within an environment having a temperature which is lower than that of the sintering stage, and
   apply the electric current to the sintered structure while the sintered structure is disposed within the environment having the temperature which is lower than that of the sintering stage to consolidate the sintered structure while the sintered structure is at a temperature which is lower than that of the sintering stage.

10. The system of claim 9 wherein the means for applying electric current, when disposing the sintered structure within the environment having the temperature which is lower than that of the sintering stage, is configured to:
   after the sintered structure exits the sintering stage and enters the environment, bring the sintered structure substantially to room temperature to enable application of the electric current to the sintered structure while the sintered structure is substantially at room temperature, the application of electric current causing substantially no rise in the temperature of the bulk sintered structure.

11. The system of claim 8 wherein the means for providing the current for the time interval includes means for providing, through the sintered structure, substantially 100 Amperes of electric current per square millimeter in the form of electric pulses.

12. A system for making a metallic product, the system comprising:
   a pressing stage which is configured to compress powder to form a green compact from the powder;
   a sintering stage, coupled to the pressing stage, which is configured to sinter the green compact to form a sintered structure from the green compact; and
   a consolidation stage, coupled to the sintering stage, which is configured to apply electric current to the sintered structure to form the metallic product from the sintered structure, the electric current being configured to consolidate the sintered structure at grain boundaries to produce the metallic product;
   wherein the sintering stage, when sintering the green compact to form the sintered structure, is arranged to:

apply furnace heat to the green compact to heat the green compact to a sintering temperature resulting in formation of the sintered structure from the green compact; and wherein the consolidation stage, when consolidating the sintered structure at grain boundaries to form produce the metallic product, is arranged to:

receive the sintered structure from the sintering stage, and provide non-uniform heating within the sintered structure using electric current resulting in formation of the metallic product;

wherein the consolidation stage is configured to apply electric current to the sintered structure after the sintering stage has completed.

13. The system of claim 12 wherein the sintering stage includes a controlled atmosphere furnace which is arranged to weld particles within the green compact together while causing minimal deformation; and wherein the consolidation stage includes a pair of electrodes which is arranged to make initial electrical contact with the sintered structure following welding of the particles, and provide bursts of electric current at periodic intervals through the sintered structure and the pair of electrodes to provide grain boundary melting to the sintered structure.

14. The system of claim 13 wherein the pair of electrodes is arranged to contact sides of the sintered structure to provide electric current that consolidates the sintered structure substantially to a penetration depth of at least 2.5 millimeters.

15. The system of claim 12 wherein when applying electric current to the sintered structure to form the metallic product from the sintered structure, the consolidation stage is further configured to apply the electric current to the sintered structure while the sintered structure is maintained at substantially room temperature, the application of electric current causing substantially no rise in the temperature of the bulk sintered structure.

16. A system for making a metallic product, the system comprising:

a pressing stage which is configured to compress powder to form a green compact from the powder;

a sintering stage, coupled to the pressing stage, which is configured to sinter the green compact to form a sintered structure from the green compact; and means, coupled to the sintering stage, for applying electric current to the sintered structure to form the metallic product from the sintered structure, the electric current being configured to consolidate the sintered structure at grain boundaries to produce the metallic product;

wherein the sintering stage, when sintering the green compact to form the sintered structure, is arranged to:

apply furnace heat to the green compact to heat the green compact to a sintering temperature resulting in formation of the sintered structure from the green compact; and wherein the means for applying the electric current includes:

means for receiving the sintered structure from the sintering stage and providing non-uniform heating within the sintered structure using electric current resulting in formation of the metallic product;

wherein the means for applying electric current to the sintered structure are configured to apply the electric current after the sintering stage has completed.

17. The system of claim 16 wherein the sintering stage includes a controlled atmosphere furnace which is arranged to weld particles within the green compact together while causing minimal deformation; and wherein the means for receiving and providing includes means for making initial electrical contact with the sintered structure following welding of the particles and providing bursts of electric current at periodic intervals through sintered structure to provide grain boundary melting to the sintered structure.

18. The system of claim 16 wherein the means for receiving and providing includes means for contacting sides of the sintered structure to provide electric current that consolidates the sintered structure substantially to a penetration depth of at least 2.5 millimeters.

19. The system of claim 16 wherein when applying electric current to the sintered structure to form the metallic product from the sintered structure, the means for applying electric current is further configured to apply the electric current to the sintered structure while the sintered structure is maintained at substantially room temperature, the application of electric current causing substantially no rise in the temperature of the bulk sintered structure.

* * * * *